US008589613B2

(12) United States Patent
Griggs (10) Patent No.: US 8,589,613 B2
(45) Date of Patent: Nov. 19, 2013

(54) METHOD AND SYSTEM TO IMPROVE THE OPERATIONS OF AN INTEGRATED NON-TRANSPARENT BRIDGE DEVICE

(75) Inventor: Aric W. Griggs, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 573 days.

(21) Appl. No.: 12/792,490

(22) Filed: Jun. 2, 2010

(65) Prior Publication Data

US 2011/0302349 A1    Dec. 8, 2011

(51) Int. Cl.
*G06F 13/36* (2006.01)
*G06F 15/163* (2006.01)

(52) U.S. Cl.
USPC ............................. 710/311; 710/306

(58) Field of Classification Search
USPC .................................. 710/311, 306
See application file for complete search history.

(56) References Cited

U.S. PATENT DOCUMENTS 6,629,179 B1 *  9/2003  Bashford .................. 710/260
2002/0144001 A1 * 10/2002  Collins et al. ............. 709/250
2009/0248947 A1 * 10/2009  Malwankar et al. ......... 710/316
2010/0074264 A1 *  3/2010  Davis et al. ................ 370/401
2010/0312943 A1 * 12/2010  Uehara et al. .............. 710/316

OTHER PUBLICATIONS

International Search Report and Written Opinion for PCT Patent Application No. PCT/US2011/035169, Mailed Jan. 9, 2012, 10 pages.

* cited by examiner

*Primary Examiner* — Nimesh G Patel
(74) *Attorney, Agent, or Firm* — Law Office of Herbert T. Patty (57) ABSTRACT

A method and system to improve the operations of an integrated non-transparent bridge device (NTB) that is coupled to another NTB device or Root Port device. The integrated NTB device has logic to maintain ordering of interrupts to be sent to the remote Root Port or NTB device. The integrated NTB device allocates a contiguous portion of the memory for both the primary Base Address Register 0 associated with the integrated NTB device and the secondary BAR0 associated with the remote NTB device. The integrated NTB device has logic to report the size of the primary BAR0 as the combined size of the primary BAR0 and the size of the secondary BAR0. The integrated NTB device facilitates the dynamic modification of a mapping of each bit of a doorbell register with a respective one of a plurality of interrupt vectors based on a mapping register.

17 Claims, 5 Drawing Sheets

METHOD AND SYSTEM TO IMPROVE THE OPERATIONS OF AN INTEGRATED NON-TRANSPARENT BRIDGE DEVICE

FIELD OF THE INVENTION

This invention relates to a non-transparent bridge, and more specifically but not exclusively, to a method and system to improve the operations of an integrated non-transparent bridge device.

BACKGROUND DESCRIPTION

A non-transparent bridge enables two hosts or memory domains to be electrically isolated. The devices on either side of the non-transparent bridge are not visible from the other side, but the non-transparent bridge allows a path for data transfer and status exchange between the processor domains of the devices.

Figure 1:
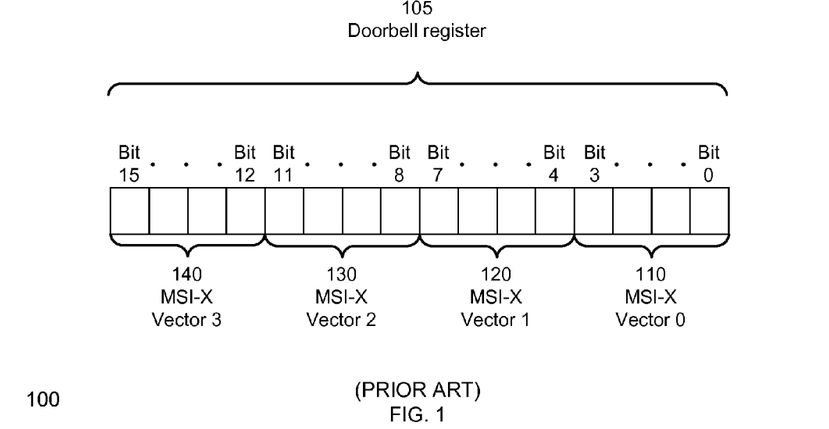
FIG. 1 illustrates a block diagram of a prior art doorbell register.

FIG. 1 illustrates a block diagram 100 of a prior art doorbell register 105. A device on the primary side of the non-transparent bridge can write or program the prior art doorbell register 105 to send interrupts upstream to another device on the secondary side of the non-transparent bridge ending up at the attached Root Port.

The prior art doorbell register 105 has fixed or hard-coded bits that are mapped to specific eXtended Message Signaled Interrupts (MSI-X) vectors. For example, the bits 0 to 3 of the prior art doorbell register 105 are mapped to the MSI-X vector 0 110 and so on. A user of the non-transparent bridge device may be restricted by the pre-defined mapping of the doorbell register bits to the MSI-X vectors.

BRIEF DESCRIPTION OF THE DRAWINGS

The features and advantages of embodiments of the invention will become apparent from the following detailed description of the subject matter in which.

DETAILED DESCRIPTION

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and system to improve the operations of an integrated non-transparent bridge (NTB) device. In one embodiment of the invention, the NTB device is coupled to another NTB device. In another embodiment of the invention, the NTB device is coupled to another Root Port device. The NTB device has logic to maintain an order of the interrupt signals to be sent to the other NTB device or Root Port device. By doing so, the ordering of the interrupts sent to the other NTB device or Root Port device can be followed.

In one embodiment of the invention, when the integrated NTB device is operating in an NTB mode, a contiguous portion or region of a memory coupled to the NTB device is allocated for both the primary Base Address Register (BAR) associated with the non-transparent bridge device and the secondary BAR associated with the other NTB or Root Port device. In one embodiment of the invention, the integrated NTB device has logic to report or indicate the size of the primary BAR as the combined size of the primary BAR and the secondary BAR.

In one embodiment of the invention, the integrated NTB device facilitates the dynamic modification of a mapping of each bit of a doorbell register with a respective one of a plurality of interrupt vectors based on a mapping register. By doing so, the doorbell register is not restricted to a pre-defined mapping and can be programmed to any mapping of the interrupt vectors. In one embodiment of the invention, the integrated NTB is compliant at least in part with the Peripheral Component Interconnect (PCI) Express standard or specification maintained by the PCI Special Interest Group (PCI-SIG). In one embodiment of the invention, the integrated NTB supports several types of interrupts such as, but not limited to, legacy INTx interrupts where x can be A, B, C or D, MSI, MSI-X and any other type of interrupts.

Figure 2:
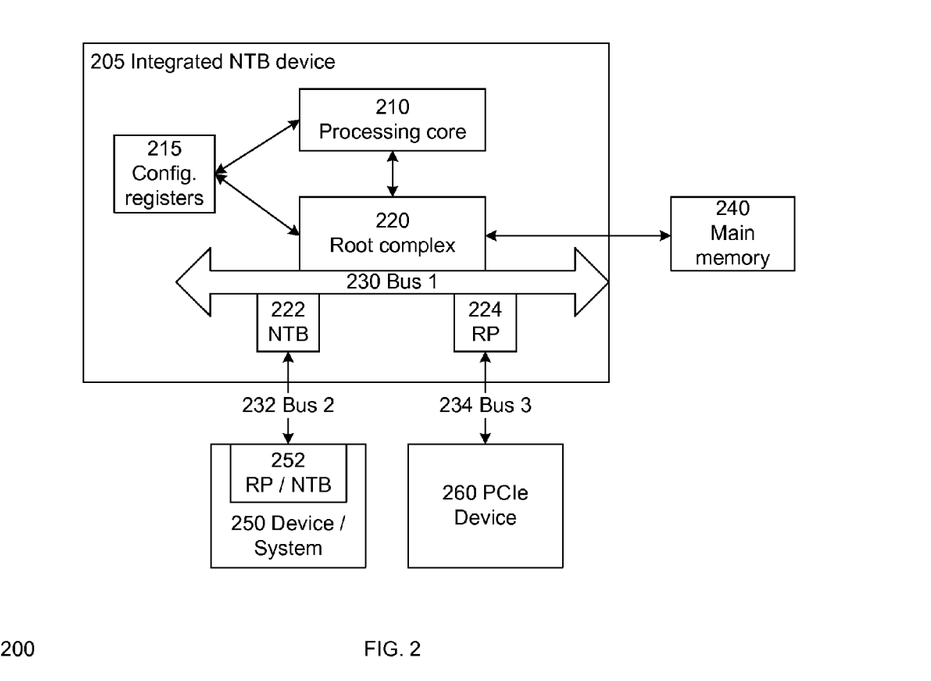
FIG. 2 illustrates a block diagram of an integrated non-transparent bridge device in accordance with one embodiment of the invention.

FIG. 2 illustrates a block diagram 200 of an integrated NTB device 205 in accordance with one embodiment of the invention. The integrated NTB device 205 has a processing core 210, configuration registers 215 and a root complex 220. In one embodiment of the invention, the root complex 220 is coupled with a bus 1 230, the configuration registers 215 and a main memory 240. The root complex 220 has a NTB 222 and a Root Port (RP) 224. The Root Port 224 is coupled with the PCI Express (PCIe) endpoint device 260 via bus 3 234. In one embodiment of the invention, the root complex 220 generates transaction requests on behalf of the processor core 210. In one embodiment of the invention, the root complex 220 is integrated with the processing core 210.

The NTB 222 is coupled with another device or system 250 via a Root Port/NTB 252. In one embodiment of the invention, the processing core 210 has logic to ensure the transactions generated by the root complex 220 are maintained in a proper PCI order. In one embodiment of the invention, the proper PCI order is based on, but is not limited to, a sequential order, a time sequence, a transaction numbering and the like. In one embodiment of the invention, the configuration registers 215 have a primary doorbell register associated with the integrated NTB device 205 and a secondary doorbell register associated with the other device/system 250.

The primary and secondary doorbell registers allow the processing core 210 of the integrated NTB device 205 to communicate with the other device/system 250 using interrupts or vectors. For example, in one embodiment of the invention, the processing core 210 communicates with the other device/system 250 by writing to the secondary doorbell register when a Root Port is attached. In another embodiment of the invention, when a remote NTB is attached, the processing core 210 communicates with the other device/system 250 by writing to a register in the configuration registers 215 which results in a transaction that targets the primary doorbell register of the other device/system 250. In one embodiment of the invention, the register in the configuration registers 215 is termed as a Back-to-Back Doorbell register.

When a particular bit of the secondary doorbell register is written or programmed, an interrupt associated with the particular bit of the secondary doorbell register is generated and sent to the other device/system 250 in one embodiment of the invention. When a remote NTB is attached and a particular bit of the Back-to-Back Doorbell register is written or programmed, a transaction is generated which targets the remote NTB's primary doorbell register. This then generates an interrupt to the remote device/system 250.

In one embodiment of the invention, the configuration registers 215 have a mapping register that indicate a mapping of each bit of the primary doorbell register with a respective interrupt vector. In another embodiment of the invention, the configuration registers 215 have a mapping register that indicate a mapping of each bit of the secondary doorbell register with a respective interrupt vector. The mapping register facilitates the dynamic modification of the mapping of each bit of the primary (or secondary) doorbell register with a respective interrupt vector.

In one embodiment of the invention, the mapping register is programmable by software executing on the processing core 210 to change the mapping of each bit of the primary doorbell register with a respective interrupt vector to change the mapping of each bit of the secondary doorbell register contained within the configuration registers 215 to be associated with a respective interrupt vector. In another embodiment of the invention, the mapping register is programmable by software executing on the remote device/system 250 to change the mapping of each bit of the secondary doorbell register contained within the configuration registers 215 to be associated with a respective interrupt vector. Each bit of the primary (or secondary) doorbell can be routed to any valid MSI-X vector that is sent to the attached Root Port/NTB 252 of the other device/system 250 in one embodiment of the invention.

In one embodiment of the invention, when the root complex 220 operates or sets one of its ports as the NTB 222, the NTB 222 has a primary base address register (BAR) for the primary side, i,e, the root complex 220, and a secondary BAR for the secondary side, i.e., the other device/system 250. In one embodiment of the invention, the primary and secondary BARs are mapped in a memory-mapped input/output region (MMIO) of the main memory 240. The other device/system 250 can use the secondary BAR to access the registers of the NTB 222.

In one embodiment of the invention, the processing core 210 has logic to initialize the MMIO of the main memory 240 by allocating a contiguous region or area of the main memory 240 for the primary and secondary BARs. By doing so, the integrated NTB 205 ensures that the secondary BAR is mapped in the main memory 240. The illustration in FIG. 2 is not meant to be limiting and different configurations of the modules in the integrated NTB device 205 can be used without affecting the workings of the invention. For example, in one embodiment of the invention, the main memory 240 is integrated with the integrated NTB device 205. In one embodiment of the invention, the integrated NTB device 205 is a single core or multiple-core processor. The other device/system 252 is compliant at least in part with the PCI Express standard or specification in one embodiment of the invention.

Figure 3:
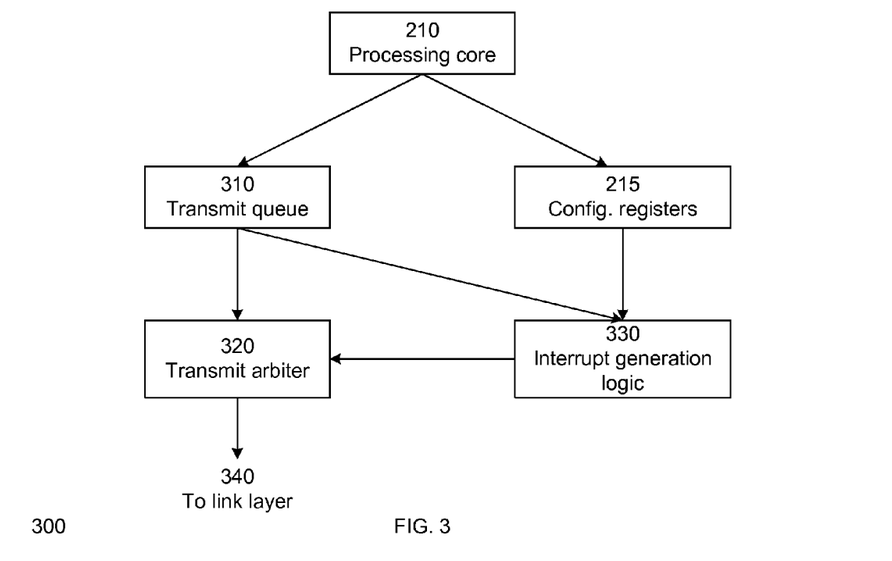
FIG. 3 illustrates a block diagram of an integrated non-transparent bridge device to maintain the order of interrupts in accordance with one embodiment of the invention.

FIG. 3 illustrates a block diagram 300 of an integrated NTB device 205 to maintain the order of interrupts in accordance with one embodiment of the invention. For clarity of illustration, FIG. 3 is discussed with reference to FIG. 2. The block diagram 300 illustrates how the integrated NTB device 205 maintains the ordering of interrupts sent to the other device/system 250. When an interrupt is to be sent by the integrated NTB device 205 to the remote device/system 250, the processing core 210 generates a doorbell transaction request. In another embodiment of the invention, the root complex 220 generates the doorbell transaction request on behalf of the processing core 210. The processing core 210 performs the doorbell transaction request by writing to a doorbell register. In one embodiment of the invention, the processing core 210 performs the doorbell transaction request by writing to the primary doorbell register. The doorbell transaction request is sent to the transmit queue 310 and to the configuration registers 215.

The interrupt generation logic 330 checks if the doorbell transaction is the next transaction in the transmit queue 310 to be popped or performed. If so, the interrupt generation logic 330 checks if the registers associated with the doorbell transaction in the configuration registers 215 have been updated. If so, the interrupt generation logic 330 sends an indication to the transmit arbiter 320 that an interrupt for the doorbell transaction is to be sent to the device/system 250. The interrupt generation logic 330 checks that both conditions are fulfilled before sending the indication to the transmit arbiter 320. By doing so, the ordering of the doorbell transaction is maintained in one embodiment of the invention.

The transmit arbiter 320 selects a transaction from the transmit queues 310 or the generated interrupt as indicted by the interrupt generation logic 330 and sends the selected transaction to the link layer 340 and to the other device/system 250. The illustration in FIG. 3 is not meant to be limiting. In one embodiment of the invention, the interrupt generation logic 330 may be performed by the processing core 210 or the root complex 220. One of ordinary skill in the relevant art will readily appreciate that other combination of the modules in the block diagram 300 may be done without affecting the workings of the invention.

Figure 4:
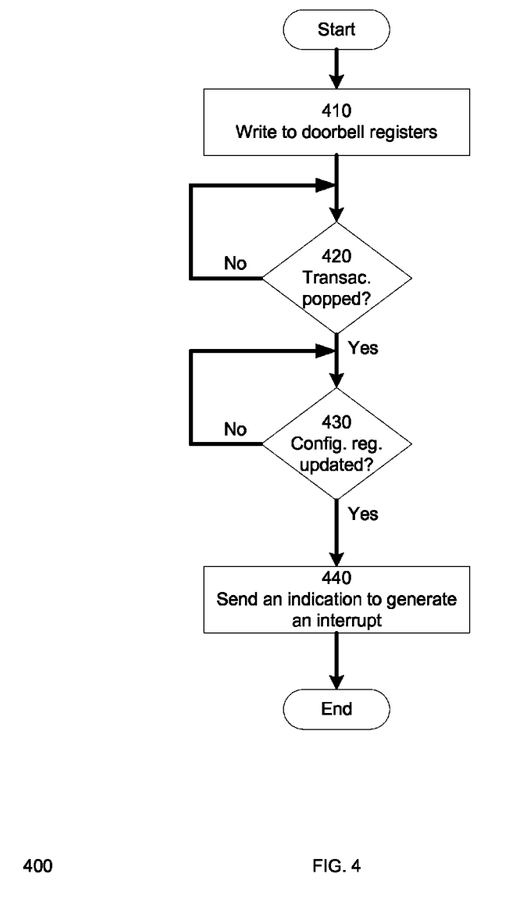
FIG. 4 illustrates a flow chart to maintain the order of interrupts in accordance with one embodiment of the invention.

FIG. 4 illustrates a flow chart 400 to maintain the order of interrupts in accordance with one embodiment of the invention. For clarity of illustration, FIG. 4 is discussed with reference to FIG. 3. In step 410, the processing core 210 writes to a doorbell register when it receives a doorbell transaction request. In one embodiment of the invention, the processing core 210 writes to a particular bit of a secondary doorbell register based on the required interrupt vector to be sent to the other device/system 250. In another embodiment of the invention, the processing core 210 writes to a particular bit of a back-to-back doorbell register based on the required interrupt vector to be sent to the other device/system 250. When the particular doorbell bit is written, the doorbell transaction is queued in the transmit queue 310 and the processing core 210 updates the register(s) associated with the doorbell transaction in the configuration registers 215.

In step 420, the interrupt generation logic 330 checks if the doorbell transaction is the next transaction in the transmit queue 310 to be executed or popped. If no, the flow 400 goes back to step 420. If yes, the flow 400 goes to step 430 to check if the register(s) associated with the doorbell transaction in the configuration registers 215 has been updated. If the registers associated with the doorbell transaction has not been updated in step 430, the flow 400 goes back to step 430. If the registers associated with the doorbell transaction has been updated in step 430, the flow 400 goes to step 440 to send an indication to generate an interrupt for the doorbell transaction and the flow 400 ends. In one embodiment of the invention, the interrupt generation logic 330 sends the indication to a transmit arbiter 320.

The steps 420 and 430 performed by the interrupt generation logic 330 ensure that a proper PCI order of the transactions is followed. The specified interrupt vector of the doorbell transaction is generated only when both conditions in step 420 and 430 have been met.

Figure 5:
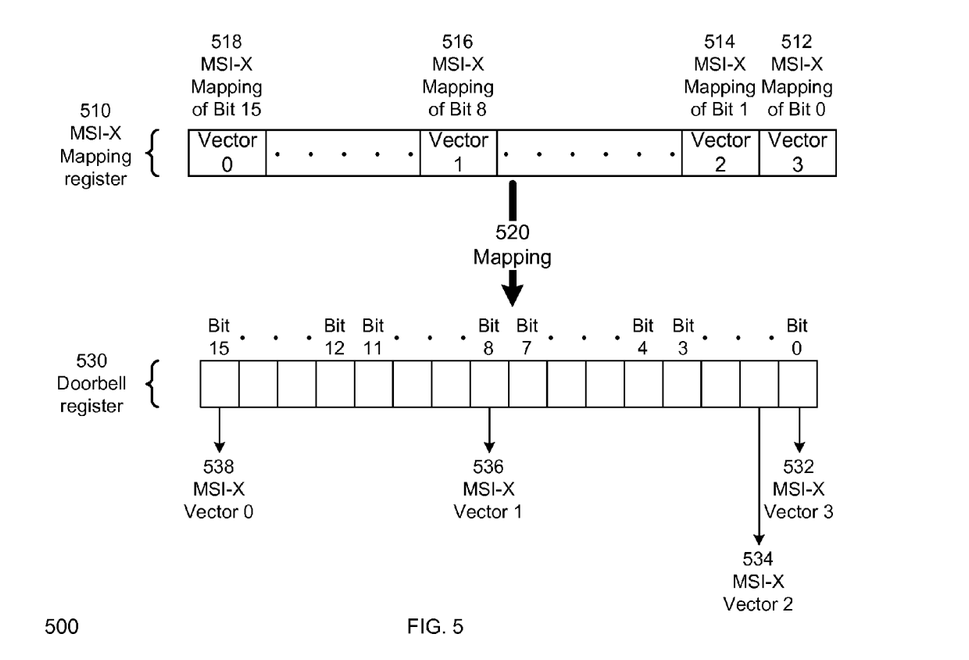
FIG. 5 illustrates a block diagram of a mapping register in accordance with one embodiment of the invention.

FIG. 5 illustrates a block diagram 500 of a mapping register in accordance with one embodiment of the invention. For clarity of illustration, the FIG. 5 illustrates a mapping 520 of the MSI-X mapping register 510 to the doorbell register 530 in one embodiment of the invention. The MSI-X mapping register 510 has programmable bits that represent the MSI-X mapping of each bit of the doorbell register 530 in one embodiment of the invention.

For example, in one embodiment of the invention, the MSI-X mapping 512 of bit 0 of the doorbell register 530 is programmed to map to MSI-X vector 3. The number of bits required to represent the MSI-X mapping 512 of bit 0 of the doorbell register 530 is dependent on the total number of unique MSI-X vectors to be sent to the other device/system 250 in one embodiment of the invention. For example, in one embodiment of the invention, if there are eight different MSI-X vectors that are available to be sent to the other device/system 250, the MSI-X mapping register 510 uses three bits to represent the mapping of each bit of the doorbell register 530 to a particular MSI-X vector.

The three bits are programmed to 000b to represent a mapping to MSI-X vector 0 538, programmed to 001b to represent a mapping to MSI-X vector 1 536 and so on. The three bits of the MSI-X mapping 512 of bit 0 of the doorbell register 530 are programmed to 011b to represent that bit 0 is mapped to MSI-X vector 3 532 in one embodiment of the invention. One of ordinary skill in the relevant art will readily appreciate that other ways to program the bits of the MSI-X mapping register 510 can be used without affecting the workings of the invention.

The MSI-X mapping register 510 allows each bit of the doorbell register 530 to be programmed to map to any available MSI-X vector. For example, bit 8 of the doorbell register 530 can be programmed to map to the MSI-X vector 1 536 in one embodiment of the invention. Unlike the prior art doorbell register 105 that has a fixed assignment of the mapping to the MSI-X vectors, the MSI-X mapping register 510 provides a flexible method for a software or firmware to dynamically modify the mapping of doorbell bits to MSI-X vectors in an integrated non-transparent bridge design.

The number of MSI-X vectors illustrated in FIG. 4 is not meant to be limiting and any number of interrupt vectors is supported by the integrated NTB device 205. In another embodiment of the invention, the mapping register maps another type of interrupt other than the MSI-X interrupts to the bits of the doorbell register 530.

Figure 6:
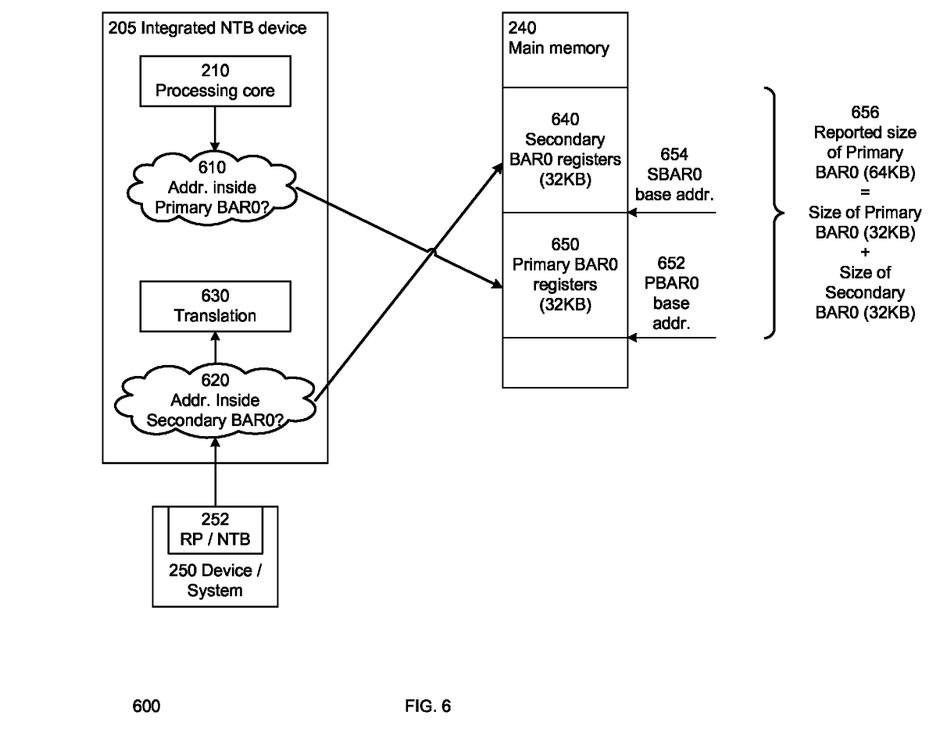
FIG. 6 illustrates a block diagram of a memory mapping of an integrated non-transparent bridge device in accordance with one embodiment of the invention.

FIG. 6 illustrates a block diagram 600 of a memory mapping of an integrated NTB device 205 in accordance with one embodiment of the invention. When operating the integrated NTB device 205 on an existing PCI Express port, there is a base address register (BAR) that the other device/system 250 can use to access the registers within the integrated NTB device 205 in one embodiment of the invention. These registers are located in the MMIO region of the main memory 240 and are termed as secondary BARs in one embodiment of the invention.

When the other device/system 250 is connected to the NTB 222 of the integrated NTB device 205, it is able to read and write registers that are part of the NTB 222 in one embodiment of the invention. To do so, the integrated NTB device 205 provides enough MMIO space for both the primary and secondary BARs in one embodiment of the invention. For example, in one embodiment of the invention, a primary BAR addresses the same MMIO registers as the secondary BAR and can have the same size. The primary and secondary BAR can have a size of 16 bits, 32 bits, or any other number of bits in one embodiment of the invention.

In one embodiment of the invention, the Secondary BAR has a fixed number of read-only bits and a fixed number of read-write bits that can be read by an enumeration software or firmware to determine the amount of memory required by the secondary BAR in the integrated NTB device 205. In one embodiment of the invention, the integrated NTB device 205 has logic to indicate the size of the primary BAR as the combination of the size of a primary BAR and a secondary BAR. For example, in one embodiment of the invention, when both the primary and secondary BARs have a size of 32 kilobytes (KB), the size of the primary BAR indicated by the integrated NTB device 205 is 64 kilobytes. By doing so, it allows the integrated NTB device 205 to allocate sufficient memory for both the primary and secondary BARs.

In one embodiment of the invention, the processing core 210 checks if there is an access to the primary BAR 610 and if so, maps the address of the access to the lower 32 kilobytes of the combined 64 kilobytes dedicated to the Primary and Secondary BARs in main memory 240 as illustrated as the primary BAR0 registers 650. The primary BAR0 base address 652 can be allocated anywhere in the main memory 240 in one embodiment of the invention. The other device/system 250 checks if there is an access to the secondary BAR in 620 and if so, the address of the access is translated in 630 and mapped to the upper lower 32 kilobytes of the main memory 240 as illustrated as the secondary BAR0 registers 640. The secondary BAR0 base address 654 is set as the sum of the primary BAR0 base address 652 and the true size (not the reported size) of the primary BAR0 in one embodiment of the invention.

The separate mapping of the primary and secondary BARs helps to ensure that the registers are only visible by the ports that are supposed to see the respective registers in one embodiment of the invention. The software operating on the processing core 210 sees that the size of the Primary BAR is reported as the size of the Primary BAR0 and the size of the Secondary BAR0 in one embodiment of the invention.

Figure 7:
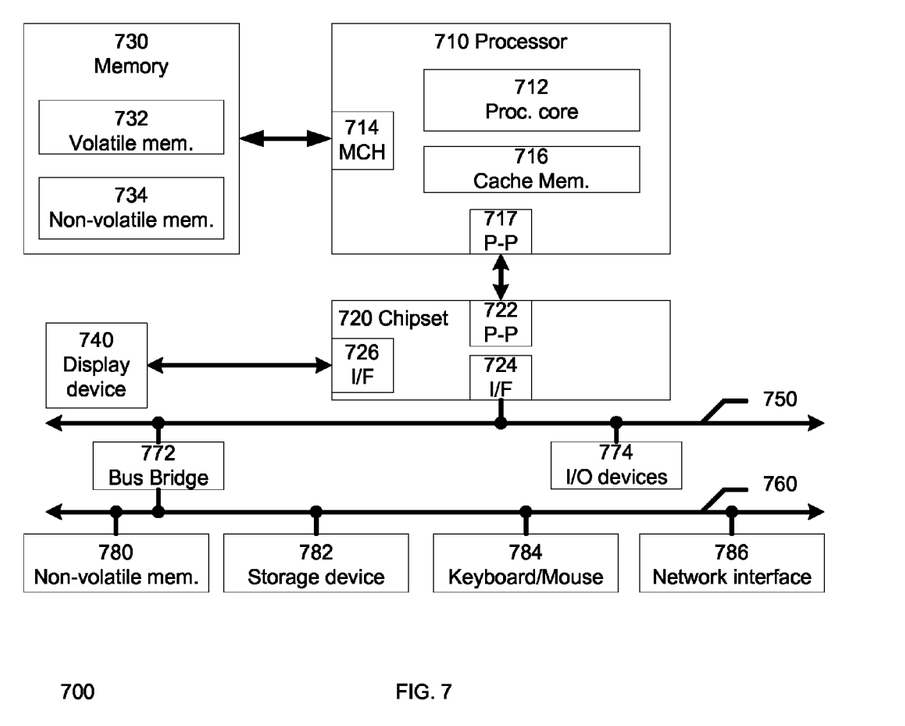
FIG. 7 illustrates a system to implement the methods disclosed herein in accordance with one embodiment of the invention.

FIG. 7 illustrates a system 700 to implement the methods disclosed herein in accordance with one embodiment of the invention. The system 700 includes, but is not limited to, a desktop computer, a laptop computer, a netbook, a notebook computer, a personal digital assistant (PDA), a server, a workstation, a cellular telephone, a mobile computing device, an Internet appliance or any other type of computing device. In another embodiment, the system 700 used to implement the methods disclosed herein may be a system on a chip (SOC) system.

The processor 710 has a processing core 712 to execute instructions of the system 700. The processing core 712 includes, but is not limited to, pre-fetch logic to fetch instructions, decode logic to decode the instructions, execution logic to execute instructions and the like. The processor 710 has a cache memory 716 to cache instructions and/or data of the system 700. In another embodiment of the invention, the cache memory 716 includes, but is not limited to, level one, level two and level three, cache memory or any other configuration of the cache memory within the processor 710.

The memory control hub (MCH) 714 performs functions that enable the processor 710 to access and communicate with a memory 730 that includes a volatile memory 732 and/or a non-volatile memory 734. The volatile memory 732 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 734 includes, but is not limited to, NAND flash memory, phase change memory (PCM), read only memory (ROM), electrically erasable programmable read only memory (EEPROM), or any other type of non-volatile memory device.

The memory 730 stores information and instructions to be executed by the processor 710. The memory 730 may also stores temporary variables or other intermediate information while the processor 710 is executing instructions. The chipset 720 connects with the processor 710 via Point-to-Point (PtP) interfaces 717 and 722. The chipset 720 enables the processor 710 to connect to other modules in the system 700. In one embodiment of the invention, the interfaces 717 and 722 operate in accordance with a PtP communication protocol such as the Intel® QuickPath Interconnect (QPI) or the like. The chipset 720 connects to a display device 740 that includes, but is not limited to, liquid crystal display (LCD), cathode ray tube (CRT) display, or any other form of visual display device.

In addition, the chipset 720 connects to one or more buses 750 and 755 that interconnect the various modules 774, 760, 762, 764, and 766. Buses 750 and 755 may be interconnected together via a bus bridge 772 if there is a mismatch in bus speed or communication protocol. The chipset 720 couples with, but is not limited to, a non-volatile memory 760, a mass storage device(s) 762, a keyboard/mouse 764 and a network interface 766. The mass storage device 762 includes, but is not limited to, a solid state drive, a hard disk drive, an universal serial bus flash memory drive, or any other form of computer data storage medium. The network interface 766 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 7 are depicted as separate blocks within the system 700, the functions performed by some of these blocks may be integrated within a single semiconductor circuit or may be implemented using two or more separate integrated circuits. For example, although the cache memory 716 is depicted as a separate block within the processor 710, the cache memory 716 can be incorporated into the processor core 712 respectively. The system 700 may include more than one processor/processing core in another embodiment of the invention.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. An apparatus comprising:
a non-transparent bridge coupled with a device via a Root Port; and
logic coupled with the non-transparent bridge to maintain an order of a plurality of interrupt signals to be sent to the device via the Root Port, wherein the logic is to:
determine whether a doorbell transaction is next to be popped from a transmission queue;
determine whether a doorbell register associated with the doorbell transaction has been updated; and
generate one of the plurality of interrupt signals in response to a determination that the doorbell transaction is next to be popped from the transmission queue and a determination that the doorbell register associated with the doorbell transaction has been updated.

2. The apparatus of claim 1, wherein the plurality of interrupt signals comprises at least one of a legacy interrupt, a message signal interrupt (MSI), and an extended MSI (MSI-X).

3. The apparatus of claim 1, further comprising a plurality of configuration registers, wherein the doorbell register is one of a plurality of configuration registers.

4. The apparatus of claim 3, wherein the plurality of configuration registers comprises a mapping register, and wherein the mapping register is to indicate a mapping of each bit of the doorbell register with a respective one of a plurality of MSI-X vectors.

5. The apparatus of claim 1, wherein the apparatus is operable in accordance with Peripheral Component Interface Express (PCIe) specification.

6. The apparatus of claim 1, further comprising a processing core, wherein the logic is part of the processing core.

7. The apparatus of claim 6, further comprising:
 a memory coupled with the processing core and the non-transparent bridge, wherein the processing core is to allocate a contiguous portion of the memory, the contiguous portion of the memory comprising a primary base address register associated with the non-transparent bridge and a secondary base address register associated with the device.

8. A system comprising:
 a memory;
 a processing core;
 a root complex coupled with the processing core, the memory, and a bus;
 a port on the bus to operate as a non-transparent bridge, the non-transparent bridge to be coupled with a device having a Root Port via a communication link, wherein the processing core is to map a secondary side of the non-transparent bridge associated with the device into a memory mapped input output (MMIO) region of the memory associated with a primary side of the non-transparent bridge by allocating a contiguous region of the memory for a primary base address register and a secondary base address register;
 interrupt generation logic coupled with the non-transparent bridge to maintain an order of a plurality of interrupt signals to be sent to the device via the communication link;
 a plurality of configuration registers, and wherein the interrupt generation logic to maintain the order of the plurality of interrupt signals to be sent to the device via the communication link is to:
 determine whether a doorbell transaction is next to be popped from a transmission queue;
 determine whether a doorbell register associated with the doorbell transaction has been updated; and
 generate one of the plurality of interrupt signals in response to a determination that the doorbell transaction is next to be popped from the transmission queue and a determination that the doorbell register associated with the doorbell transaction has been updated.

9. The system of claim 8, wherein the processing core is further to report a size of the primary base address register as a size of the contiguous region of the memory.

10. The system of claim 8, wherein the device is one of another non-transparent bridge device and Root Port device.

11. The system of claim 8, wherein the plurality of configuration registers comprises a mapping register, and wherein the mapping register is to indicate a mapping of each bit of the doorbell register with a respective one of a plurality of vectors.

12. The system of claim 8, wherein the plurality of vectors comprises at least one of a legacy interrupt, a message signal interrupt (MSI), and an extended MSI (MSI-X).

13. The system of claim 12, wherein the system is operable in accordance with Peripheral Component Interface Express (PCIe) specification.

14. A method comprising:
 facilitating dynamic modification of a mapping of each bit of a doorbell register with a respective one of a plurality of vectors, wherein the mapping is based at least in part on a mapping register;
 maintaining an order of a plurality of interrupt signals to be sent to a device via a Root Port;
 wherein maintaining the order of the plurality of interrupt signals to be sent to the device via the Root Port comprises:
 determining whether a doorbell transaction is next to be popped from a transmission queue;
 determining whether a doorbell register associated with the doorbell transaction has been updated; and
 generating one of the plurality of interrupt signals in response to a determination that the doorbell transaction is next to be popped from the transmission queue and a determination that the doorbell register associated with the doorbell transaction has been updated.

15. The method of claim 14, wherein the mapping register comprises one or more bits associated with each bit of the doorbell register, further comprising:
 programming the one or more bits associated with each bit of the doorbell register to set the mapping of each bit of the doorbell register with the respective one of the plurality of vectors.

16. The method of claim 15, wherein the plurality of vectors comprises at least one of a legacy interrupt, a message signal interrupt (MSI), and an extended MSI (MSI-X).

17. The method of claim 14, further comprising:
 indicating a size of a primary base address register as a sum of a size of the primary base address register and a size of a secondary base address register.

* * * * *